(12) United States Patent
Ouyang et al.

(10) Patent No.: US 12,419,410 B1
(45) Date of Patent: Sep. 23, 2025

(54) CLEANING BRUSH MAIN BODY AND CLEANING BRUSH

(71) Applicant: Shenzhen Huijing Technology Co., Ltd., Shenzhen (CN)

(72) Inventors: Zuhui Ouyang, Shenzhen (CN); Xingwen Leng, Shenzhen (CN)

(73) Assignee: Shenzhen Huijing Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/916,700

(22) Filed: Oct. 16, 2024

(30) Foreign Application Priority Data

Aug. 1, 2024 (CN) .......................... 202421853540.X

(51) Int. Cl.
*A46B 13/02* (2006.01)
*F16H 57/08* (2006.01)

(52) U.S. Cl.
CPC ............ *A46B 13/02* (2013.01); *F16H 57/082* (2013.01); *A46B 2200/3033* (2013.01)

(58) Field of Classification Search
CPC ....... A46B 13/008; A46B 13/02; A46B 13/00; A46B 2200/30; A46B 2200/3033; F16H 57/082; F16H 2001/289; F16H 1/46; F16H 1/28; H02K 7/116
USPC .................... 15/22.1, 28, 97.1; 475/330, 337
See application file for complete search history.

(56) References Cited

U.S. PATENT DOCUMENTS

| | | | | |
|---|---|---|---|---|
| 2,497,659 A * | 2/1950 | Davis | ...................... | E21B 37/02 166/170 |
| 5,226,198 A * | 7/1993 | Martin | ................ | B05C 17/0205 15/176.3 |
| 7,313,838 B2 * | 1/2008 | Long | .................... | A47L 11/4036 15/50.2 |
| 7,414,337 B2 * | 8/2008 | Wilkinson | ................ | B25F 5/02 310/68 R |
| 8,978,517 B2 * | 3/2015 | Meyers | ................... | B25B 17/00 81/3.2 |
| 9,816,587 B2 * | 11/2017 | Koike | ........................ | F16H 1/46 |
| 2002/0104177 A1 * | 8/2002 | Wong | .................... | A46B 13/008 15/49.1 |

* cited by examiner

*Primary Examiner* — Katina N. Henson
*Assistant Examiner* — Sharonda T Felton

(57) ABSTRACT

The present disclosure provides a cleaning brush main body and a cleaning brush, the cleaning brush main body includes an outer shell, a drive motor, an output connector and a planetary gear set. The drive motor is installed in the outer shell and includes an output shaft. The output connector is rotatably arranged relative to the outer shell. At least one stage of planetary gear set is coupled between the output connector and the output shaft. The at least one stage of planetary gear set is installed in the outer shell. One end of the output connector is connected to the planetary gear set, and the other end is used to install a brush body. The brush body can continuously wipe surfaces to be cleaned by rotating, avoiding the need to manually wipe cleaning utensils back and forth many times, and avoiding reduction of cleaning efficiency due to human fatigue.

20 Claims, 10 Drawing Sheets

CLEANING BRUSH MAIN BODY AND CLEANING BRUSH

CROSS-REFERENCE TO RELATED APPLICATIONS

The present application claims priority of Chinese Patent Application No. 202421853540.X, filed on Aug. 1, 2024, the entire contents of which are hereby incorporated by reference.

TECHNICAL FIELD

The present disclosure relates to the field of cleaning utensil, and in particular to a cleaning brush main body and a cleaning brush.

BACKGROUND

As a degree of social industrialization increases, people's work gradually becomes more professional, and social division of labor becomes more detailed, professional people spend most of their time on work, and their income is relatively increased, but their time on family is relatively reduced.

Traditional household cleaning mainly relies on manpower for cleaning, such as washing dishes, cleaning desktops, cleaning cabinet stains, cleaning walls, cleaning floor corners and the like. In some household cleaning, a cleaning tool needs to be wiped back and forth many times on a surface of a position to be cleaned by manpower. When the cleaning tool is manually operated, a reciprocating wiping speed is generally slow, which makes efficiency of the household cleaning low, and thereby resulting in the cleanliness of home environment not being ensured.

SUMMARY

In view of the above, the present disclosure provides a cleaning brush main body and a cleaning brush that can solve or at least alleviate above technical problems.

The present disclosure provides a cleaning brush main body, including:
  an outer shell;
  a drive motor, installed in the outer shell, and the drive motor includes an output shaft;
  an output connector, rotatably arranged relative to the outer shell; and
  at least one stage of planetary gear set, coupled between the output connector and the output shaft of the drive motor; and the at least one stage of planetary gear set is installed in the outer shell.

For the cleaning brush main body above, one end of the output connector is connected to the planetary gear set, and the other end of the output connector is configured to install the brush body. When the drive motor runs in the outer shell, the output shaft of the drive motor transmits torque to the output connector through the at least one stage of planetary gear set, therefore, a rotation speed of the output connector is lower than a rotation speed of the output shaft of the drive motor, and simultaneously, torque of the output connector is greater than torque of the output shaft of the drive motor. When the drive motor rotates continuously, the brush body can rotate continuously. When the brush body is attached to a surface of a position to be cleaned, the brush body can continuously wipe the surface of the position to be cleaned by rotating, thereby avoiding a need to manually wipe a cleaning utensil back and forth many times, and avoiding reduction of cleaning efficiency due to human fatigue, which is conducive to ensuring cleanliness of home environment. In addition, since the torque of the output connector when rotating is increased relative to the output shaft of the drive motor, the brush body can be prevented from stopping due to an excessive resistance on the surface of the position to be cleaned, which is conducive to a stable operation of the cleaning brush.

In one embodiment, the at least one stage of planetary gear set includes a first stage planetary gear set; and the first planetary gear set includes a first sun gear, a first inner gear ring, a first rotating carrier and at least one first planetary gear; the first sun gear is anti-rotationally coupled to an output shaft of the drive motor, at least one first planetary gear is rotatably supported on the first rotating carrier, and two sides of the at least one first planetary gear are meshed with an outer periphery of the first sun gear and an inner periphery of the first inner gear ring respectively.

In one embodiment, the at least one stage of planetary gear set further includes a second stage planetary gear set; and the second planetary gear set includes a second sun gear, a second inner gear ring, a second rotating carrier and at least one second planetary gear; the second sun gear is anti-rotationally coupled to the second rotating carrier, the at least one second planetary gear is rotatably supported on the second rotating carrier, and two sides of the at least one second planetary gear are meshed with an outer periphery of the second sun gear and an inner periphery of the second inner gear ring respectively.

In one embodiment, the cleaning brush main body further includes a machine case; the at least one stage of planetary gear set is located in the machine case; and the first inner gear ring and the second inner gear ring are fixedly arranged on an inner peripheral wall of the machine case.

In one embodiment, the cleaning brush main body further includes a machine case and a case cover; the drive motor includes a main body; a space capable of accommodating the at least one stage of planetary gear set is defined by the case cover and the machine case cooperatively; the output connector is rotatably inserted through the case cover; and the machine case abuts between the main body of the drive motor and the case cover.

In one embodiment, the cleaning brush main body further includes a front cover, the outer shell includes a front end and a tail end; the front end of the outer shell abuts against the front cover; the case cover includes an inner cylindrical part and a ring body part connected to an outer periphery of the inner cylindrical part; the inner cylindrical part is positioned and inserted into the front cover of the outer shell; the output connector is rotatably inserted through the inner cylindrical part; the ring body part is accommodated in the outer shell, and is disposed opposite to interior of the machine case; a fourth sealing element is abutted between an outer surface of the ring body part and the front cover, the fourth sealing element is in a thin ring shape, the fourth sealing element is disposed around the inner cylindrical part, and abuts between the ring body part and an inner surface of the front cover.

In one embodiment, the outer shell includes a first shell and a second shell; the first shell and the second shell are respectively provided with an inner cavity; the inner cavity is provided with an opening; an opening edge of the first shell is docked with an opening edge of the second shell; the inner cavity of the first shell is provided with a plurality of first connecting columns extending towards the opening, and the second inner cavity of the second shell is provided with a plurality of second connecting columns extending towards the opening; and when the first shell is docked with the second shell, the plurality of first connecting columns and the plurality of second connecting columns are aligned and engaged with each other.

In one embodiment, a first partition wall is provided on an inner surface of the first shell, and the inner cavity of the first shell is divided into a first central area and a first peripheral area by the first partition wall; the plurality of first connecting columns are located on periphery of the first partition wall; a second partition wall is provided on an inner surface of the second shell, and the inner cavity of the second shell is divided into a second central area and a second peripheral area by the second partition wall; the plurality of second connecting columns are located on periphery of the second partition wall; and when the first shell is docked with the second shell, an end edge of the first partition wall abuts against an end edge of the second partition wall.

In one embodiment, one of the end edge of the first partition wall and the end edge of the second partition wall is provided with a first edge recessed groove, and the other one is provided with a first edge convex part; the first edge recessed groove is capable of accommodating the first edge convex part; and a first sealing element is accommodated in the first edge recessed groove.

In one embodiment, one of the first shell and the second shell is connected with a positioning column, and the other one is connected with a positioning rod; and the positioning rod is inserted into the positioning column.

In one embodiment, a second sealing element is sleeved on an outer periphery of the output connector; the second sealing element abuts against an outer surface of the outer shell; and an outer wall of the second sealing element is arranged in an expanded transition along a direction close to the outer surface of the outer shell.

In one embodiment, a positioning installation groove is provided on an outer peripheral side of the output connector, and the positioning installation groove is arranged around the outer periphery of the output connector; and an inner peripheral part of the second sealing element is accommodated in the positioning installation groove.

In one embodiment, the cleaning brush main body further includes a limit bracket; the limit bracket is connected between the drive motor and the outer shell; an axial positioning groove is provided on an inner surface of the outer shell; the drive motor is surrounded by an inner space of the axial positioning groove in a circumferential direction; an outer periphery of the limit bracket is accommodated in the axial positioning groove; and a positioning structure is formed between the outer shell and the limit bracket, and a rotation of the limit bracket relative to the outer shell is limitable by the positioning structure.

In one embodiment, a first positioning groove is provided on the outer periphery of the limit bracket; a first positioning block is provided on the outer shell; the first positioning block is accommodated in the axial positioning groove; and the first positioning block is used to be correspondingly embedded in the first positioning groove.

In one embodiment, the cleaning brush main body further includes a fixed bracket; the fixed bracket is connected between the drive motor and the limit bracket; a lug part is formed on an outer periphery of the fixed bracket, and the lug part is used to dock with the limit bracket; and a fourth connecting column is provided on the limit bracket.

In one embodiment, the cleaning brush main body further includes an extension rod; the outer shell includes a first shell, a second shell and a tail cover; the tail end is arranged away from the output connector relative to the front end; an outer periphery of the tail end of the first shell and the tail end of the second shell is surrounded by the tail cover; a docking hole is defined by the tail end of the first shell and the tail end of the second shell cooperatively; and one end of the extension rod is threaded through the docking hole.

In one embodiment, one of the tail end of the first shell and the tail end of the second shell is provided with a positioning protrusion, and the other one is provided with a second positioning groove; the second positioning groove is used to engage the positioning protrusion; and an internal thread is formed on an inner wall surface of the docking hole, and one end of the extension rod is provided with an external thread matching the internal thread.

In one embodiment, the outer shell includes the front end and the tail end; the outer shell presents a narrowed transition from the front end to the tail end; and the outer shell presents a bent transition from the front end to the tail end.

In one embodiment, the cleaning brush main body further includes a light emitting element installed on the outer shell; and illumination light rays beamed toward an outer peripheral side of the output connector are generable by the light emitting element.

The present disclosure provides a cleaning brush including a brush body and the cleaning brush main body of any of the above embodiments; and the brush body is connected to the output connector.

Figure 1:
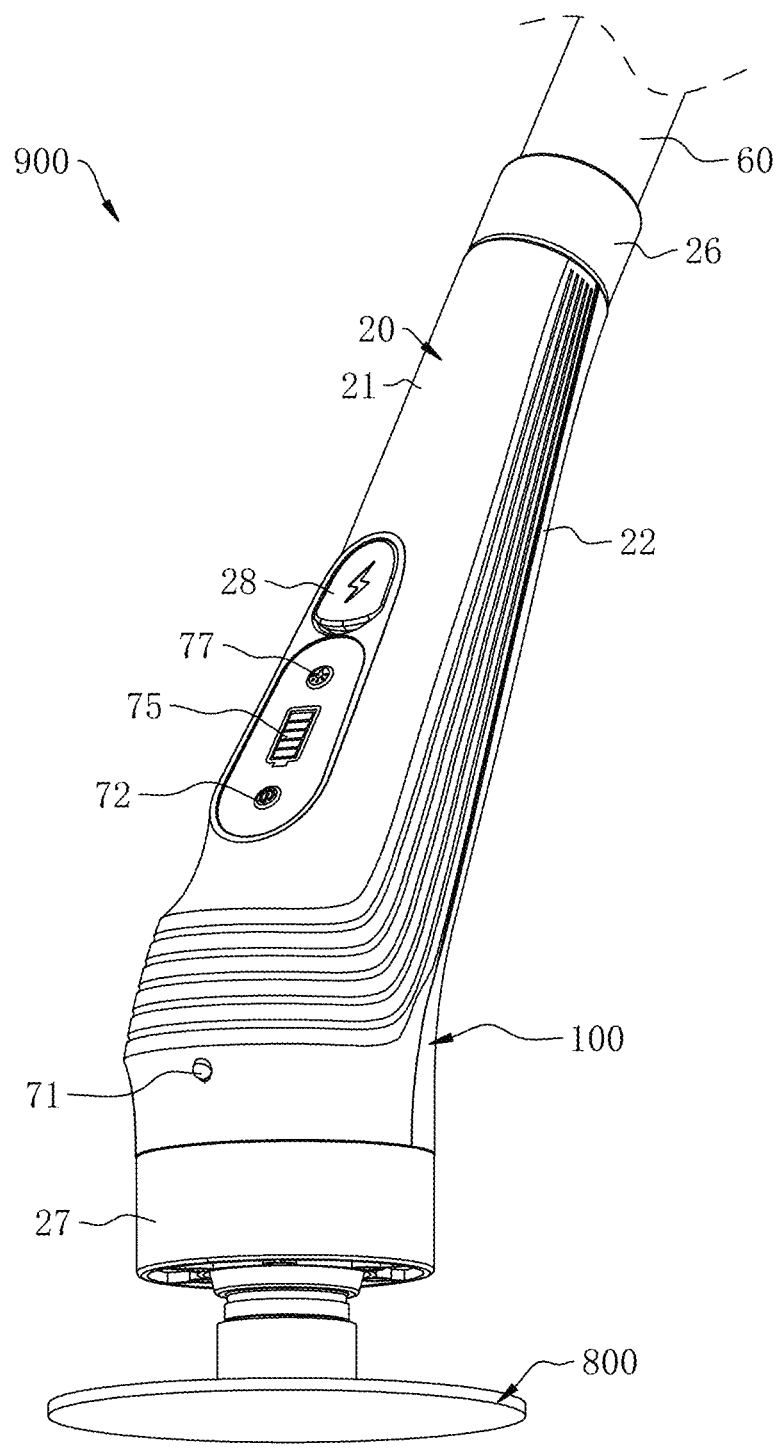
FIG. 1 is a perspective schematic view of a cleaning brush according to one embodiment of the present disclosure.

Reference numerals: 900, cleaning brush; 100, brush body; 20, outer shell; 21, first shell; 210/220, inner cavity; 219/229, opening; 21*a*/22*a*, front end; 21*b*/22*b*, tail end; 211, first connecting column; 212, positioning rod; 213, docking hole; 2131, internal thread; 214, second positioning groove; 215, third positioning groove; 216, second edge convex part; 217, slot; 218, reserved opening; 22, second shell; 221, second connecting column; 222, positioning column; 223, positioning protrusion; 224, third edge convex part; 23, first partition wall; 231, accommodation space; 232, first edge recessed groove; 233/243, central area; 234/244, peripheral area; 235/245, end edge; 24, second partition wall; 241, first edge convex part; 25, axial positioning groove; 242, first positioning block; 26, tail cover; 27, front cover; 271, second edge recessed groove; 272, second positioning block; 273, third sealing element; 28, charging waterproof cap; 281, hook part; 30, drive motor; 301, output shaft; 302, main body; 31, limit bracket; 311, third connecting column; 312, fourth connecting column; 313, first positioning groove; 32, fixed bracket; 321, lug part; 40, planetary gear set; 41, sun gear; 42, rotating carrier; 421, plate body; 422, columnar part; 43, planetary gear; 44, inner gear ring; 45, machine case; 46, case cover; 461, inner cylindrical part; 462, ring body part; 47, fourth sealing element; 50, output connector; 501, positioning installation groove; 52, second sealing element; 60, extension rod; 70, electrical component; 71, light emitting element; 72, main switch; 73, circuit board; 731, charging interface; 74, energy storage element; 75, power indicator light; 76, light-transmitting switch cap; 77, light switch; 800, brush body; 801, brush disk.

DESCRIPTION OF EMBODIMENTS

Technical solutions of the present disclosure are described clearly and completely below in conjunction with accompanying drawings, apparently, described embodiments are only part of the embodiments of the present disclosure, not all of the embodiments. Based on the embodiments of the present disclosure, all other embodiments obtained by those of ordinary skill in the art without creative work are within a protection scope of the present disclosure.

In the description of the present disclosure, it should be noted that the orientation or positional relationship indicated by the terms "center", "up", "down", "left", "right", "vertical", "horizontal", "inside", "outside" and the like is based on the orientation or positional relationship shown in the accompanying drawings, which is only for the convenience of describing the present disclosure and simplifying the description, rather than indicating or suggesting that a device or a component referred to must have a specific orientation and be constructed and operated in a specific orientation, and therefore the terms cannot be understood as limiting the present disclosure. Furthermore, the terms "first", "second" and "third" are just used for descriptive purposes, and cannot be understood as indicating or implying relative importance.

In the description of the present disclosure, it should be noted that unless otherwise expressly specified or limited, the terms "installed", "mounted", "be connected" and "connect" should be understood in a broad sense, for example, it may be a fixed connection, it may also be a detachable connection, or an integrated connection; it may be a mechanical connection, or alternatively an electrical connection; it may be a direct connection, it may also be an indirect connection through an intermediate element; alternatively, it may be an internal communication between two components. For those of ordinary skill in the art, specific meanings of the above terms in the present disclosure can be understood according to specific situations.

The technical solutions provided by the embodiments of the present disclosure are described below in conjunction with the accompanying drawings.

FIG. 1 to FIG. 10 shows a cleaning brush 900 in at least one embodiment of the present disclosure. Specifically, referring to FIG. 1 to FIG. 3, the cleaning brush 900 includes a cleaning brush main body 100 and a brush body 100. The cleaning brush main body 100 can drive the brush body 800 to rotate quickly, thereby efficiently completing cleaning operations such as washing dishes, cleaning desktops, cleaning cabinet stains, cleaning wall dust, cleaning the ground, or cleaning corner stains, and the like. The cleaning brush 900 can also be used to clean stoves, clean glass dust, clean ceilings, wash bathroom floors, wash toilets or wash bathtubs.

As shown in FIG. 2 to FIG. 5, in one embodiment of the present disclosure, the cleaning brush main body 100 includes an outer shell 20, a drive motor 30, an output connector 50 and a planetary gear set 40. The drive motor 30 is installed in the outer shell 20. The drive motor 30 includes an output shaft 301. The output connector 50 is rotatably arranged relative to the outer shell 20. At least one stage of planetary gear set 40 is coupled between the output connector 50 and the output shaft 301 of the drive motor 30. The at least one stage of planetary gear set 40 is installed in the outer shell 20.

Specifically, one end of the output connector 50 is connected to the planetary gear set 40, and the other end of the output connector 50 is configured to install the brush body 800. When the drive motor 30 runs in the outer shell 20, the output shaft 301 of the drive motor 30 transmits torque to the output connector 50 through the at least one stage of planetary gear set 40, therefore, a rotation speed of the output connector 50 is lower than a rotation speed of the output shaft 301 of the drive motor 30, and simultaneously, torque of the output connector 50 is greater than torque of the output shaft 301 of the drive motor 30. When the drive motor 30 rotates continuously, the brush body 800 can rotate continuously. When the brush body 800 is attached to a surface of a position to be cleaned, the brush body 800 can continuously wipe the surface of the position to be cleaned by rotating, thereby avoiding a need to manually wipe a cleaning utensil back and forth many times, and avoiding reduction of cleaning efficiency due to human fatigue, which is conducive to ensuring cleanliness of home environment. In addition, since the torque of the output connector 50 when rotating is increased relative to the output shaft 301 of the drive motor 30, the brush body 800 can be prevented from stopping due to an excessive resistance on the surface of the position to be cleaned, which is conducive to a stable operation of the cleaning brush 900.

Figure 2:
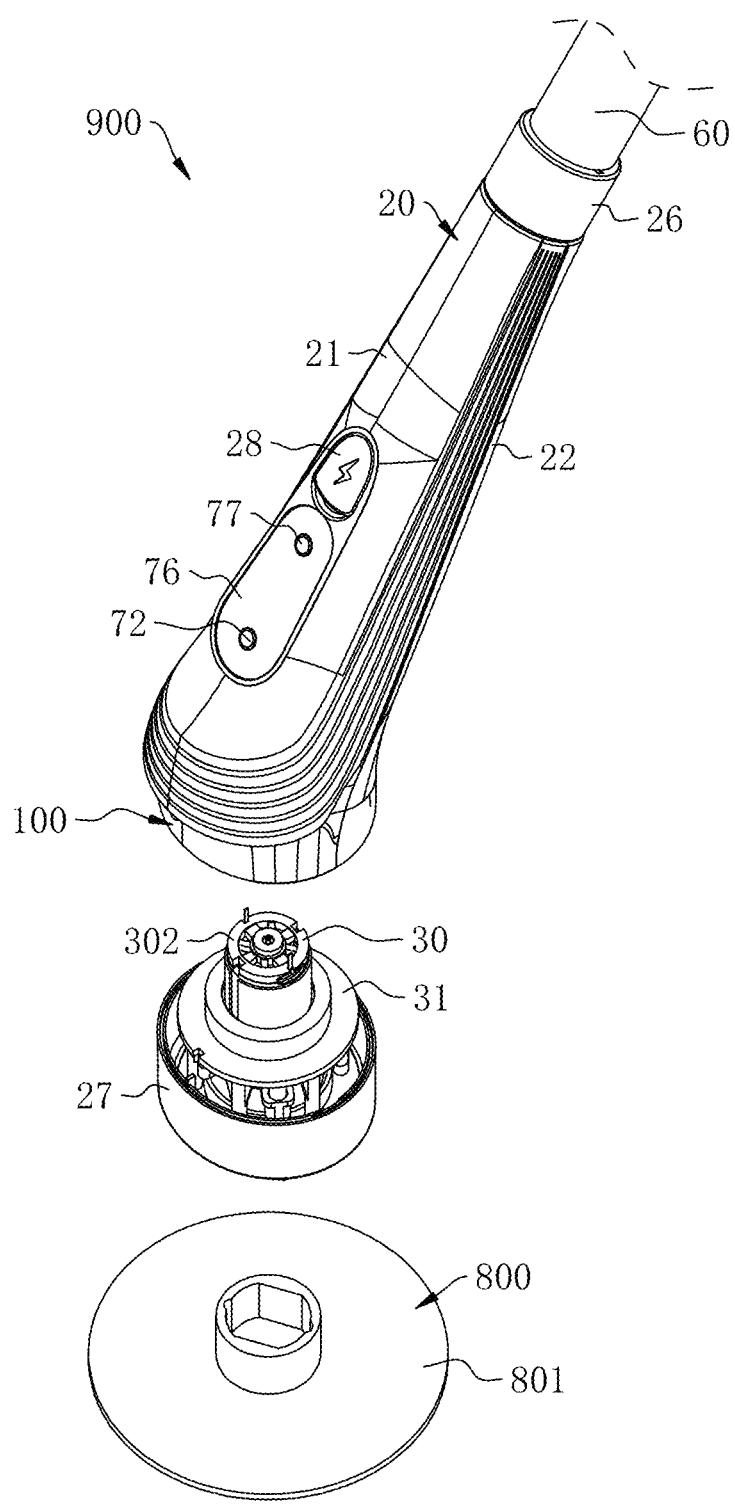
FIG. 2 is an exploded schematic view of the cleaning brush shown in FIG. 1.
Figure 9:
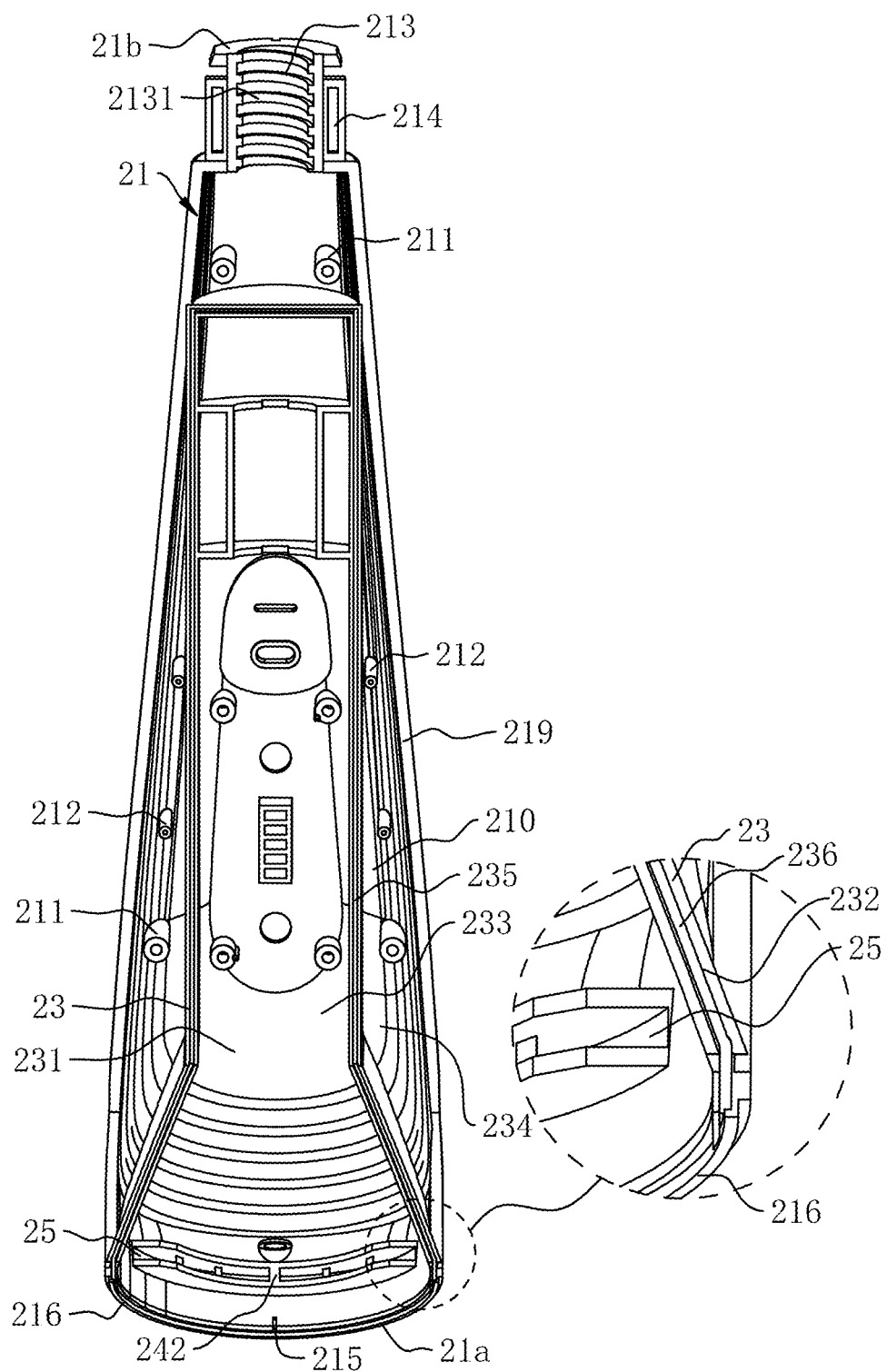
FIG. 9 is a structural schematic view of the inside of a first shell of the cleaning brush shown in FIG. 1.
Figure 10:
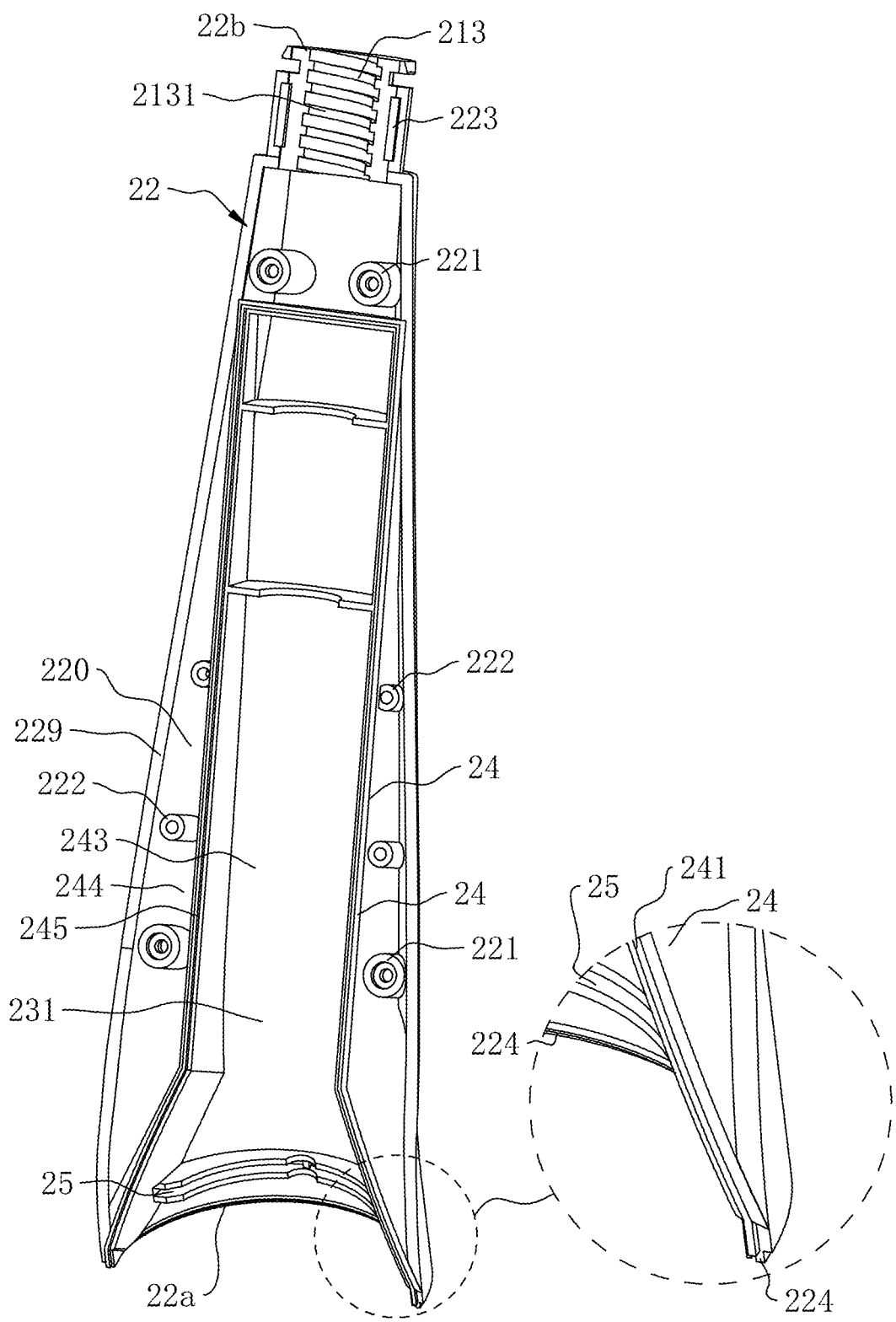
FIG. 10 is a structural schematic view of the inside of a second shell of the cleaning brush shown in FIG. 1.

In some embodiments, as shown in FIG. 2, the outer shell 20 is provided with a front end (21a as shown in FIGS. 9 and 22a as shown in FIG. 10) and a tail end (21b in as shown in FIGS. 9 and 22b as shown in FIG. 10). The tail end is arranged away from the output connector 50 or the brush body 800 relative to the front end.

In some embodiments, as shown in FIG. 2, FIG. 9 and FIG. 10, the outer shell 20 includes a first shell 21 and a second shell 22. Each of the first shell 21 and the second shell 22 is provided with an inner cavity, and the inner cavity includes an opening. An opening edge of the first shell 21 is docked with an opening edge of the second shell 22, therefore, an installation space is defined by communicating two inner cavities cooperatively.

Specifically, a plurality of first connecting columns 211 extending towards the opening 219 are arranged in the inner cavity 210 of the first shell 21. A plurality of second connecting columns 221 extending towards the opening 229 are arranged in the inner cavity 220 of the first shell 22. When the first shell 21 is docked with the second shell 22, the first connecting columns 211 and the second connecting columns 221 are aligned and engaged with each other, at this time, a fastener can be used to insert through the second connecting column 221 and threadedly connected to the first connecting column 211, therefore, the first connecting column 211 and the second connecting column 221 can be fixedly connected, and simultaneously, the first shell 21 and the second shell 22 can be fixedly connected. In one embodiment, the fastener is inserted through the second connecting column 221 and threadedly connected to the first connecting column 211. It can be understood that in other embodiments, the fastener can also be inserted through the first connecting column 211 and threadedly connected to the second connecting column 221.

Preferably, a first partition wall 23 is provided on an inner surface of the first shell 21, and the inner cavity 210 of the first shell 21 is divided into a central area 233 and a peripheral area 234 by the first partition wall 23. The first connecting column 211 is disposed on periphery of the first partition wall 23, that is, located in the peripheral area 234 of the inner cavity 210 of the first shell 21. A second partition wall 24 is provided on an inner surface of the second shell 22. The inner cavity 220 of the second shell 22 is divided into a central area 243 and a peripheral area 244 by the second partition wall 24. The second connecting column 221 is disposed on periphery of the second partition wall 24, that is, located in the peripheral area 244 of the inner cavity 220 of the second shell 22. When the first shell 21 is docked with the second shell 22, an end edge 235 of the first partition wall 23 abuts against an end edge 245 of the second partition wall 24, therefore, the central area 233 of the inner cavity 210 of the first shell 21 and the central area 243 of the inner cavity 220 of the second shell 22 are communicated and form an accommodation space 231 cooperatively, and the accommodation space 231 is sealed. The drive motor 30 and/or other electrical components are accommodated in the accommodation space 231.

Due to an influence of a use environment, the cleaning brush 900 is frequently in an environment that is easily splashed by water flow. The first connecting column 211 and the second connecting column 221 are respectively arranged on periphery of the accommodation space 231, therefore, when there is a butt joint gap between the first connecting column 211 and the second connecting column 221, the water flow or water droplets may be flowed through the butt joint gap. Due to an arrangement of the first partition wall 23 and the second partition wall 24, and the accommodation space 231 defined therefrom cooperatively, therefore, even if the water flow is flowed through the butt joint gap between the first connecting column 211 and the second connecting column 221, the water flow cannot enter the accommodation space 231 containing the drive motor 30 due to obstruction of the first partition wall 23 and the second partition wall 24, thereby improving a waterproof protection effect of the drive motor 30 or other electrical components.

In some embodiments, a part of an edge of the second partition wall 24 is arranged to overlap with an edge of the front end 22a of the second shell 22.

In some embodiments, a part of an edge of the first partition wall 23 can directly abut against the part of the edge of the second partition wall 24.

In some other embodiments, the end edge 235 of the first partition wall 23 can indirectly abut against the end edge 245 of the second partition wall 24. In some embodiments, the end edge 235 of the first partition wall 23 is distributed to the front end 21a of the first shell 21. The end edge 245 of the second partition wall 24 is distributed to the front 22a of the second shell 22.

In some embodiments, as shown in FIG. 9 and FIG. 10, one of the end edge of the first partition wall 23 and the end edge of the second partition wall 24 is provided with a first edge recessed groove 232, and the other one is provided with a first edge convex part 241. The first edge convex part 241 can be accommodated in the first edge recessed groove 232. A first sealing element 236 is also accommodated in the first edge recessed groove 232. Specifically, the first sealing element 236 is flexible, and the first sealing element 236 is extended along a length direction of the first edge recessed groove 232. When the first sealing element 236 is accommodated in the first edge recessed groove 232, the first edge convex part 241 is embedded into the first edge recessed groove 232, the first sealing element 236 is simultaneously resisted by a wall surface of the first edge recessed groove 232 and the first edge convex part 241, therefore, the first sealing element 236 can be used to position and fill a gap between the first partition wall 23 and the second partition wall 24, and thus the accommodation space 231 defined by the first partition wall 23 and the second partition wall 24 has better sealing performance.

Specifically, the first sealing element 236 is made of rubber, silica gel or other flexible sealing materials. In some embodiments, the first sealing element 236 is in a long strip shape. In some embodiments, the first sealing element 236 is a silica gel sealing strip. In some embodiments, a diameter of the first sealing element 236 is smaller than a depth of the first edge recessed groove 232, thereby ensuring that the first edge recessed groove 232 has a space reserved for accommodating the first edge convex part 241. In some embodiments, the diameter of the first sealing element 236 is 1 mm.

In some embodiments, as shown in FIG. 2, FIG. 9 and FIG. 10, an inner surface of one of the first shell 21 and the second shell 22 is connected with a positioning column 222, and an inner surface of the other one is provided with a positioning rod 212. When the first shell 21 and the second shell 22 are docked and connected, the positioning rod 212 is inserted into the positioning column 222. The positioning rod 212 is inserted into the positioning column 222, which can play a positioning role between the first shell 21 and the second shell 22, therefore, the end edge 235 of the first partition wall 23 accurately corresponds to the end edge 245 of the second partition wall 24, and the first connecting column 211 accurately corresponds to the second connecting column 221. In some embodiments, including a plurality of positioning columns 222 and a plurality of positioning rods 212, which are arranged at different positions of the first shell 21 and the second shell 22 respectively, thereby preventing the edges of the first shell 21 or the second shell 22 from fitting accurately due to stress deformation. In some embodiments, the positioning column 222 is connected to the second shell 22, and the positioning rod 212 is connected to the first shell 21.

In some embodiments, as shown in FIG. 9, the positioning column 222 is arranged on the periphery of the second partition wall 24, and the positioning rod 212 is arranged on the periphery of the first partition wall 23, thereby avoiding the positioning column 222 or the positioning rod 212 occupying the accommodation space 231 and reducing an installation space for the electrical components such as the drive motor 30 and the like. It is understandable that, under the premise of ensuring the installation space for electrical components such as the drive motor 30 and the like, the positioning column 222 or the positioning rod 212 can also be disposed in the accommodating space 231.

In some embodiments, as shown in FIG. 9 and FIG. 10, the tail end of one of the first shell 21 and the second shell 22 is provided with a positioning protrusion 223, and the tail end of the other one is provided with a second positioning groove 214. The second positioning groove 214 is used to engage the positioning protrusion 223, the tail end 21b of the first shell 21 and the tail end 22b of the second shell 22 are accurately docked, and a large edge gap between the tail end 21*b* of the first shell 21 and the tail end 22*b* of the second shell 22 due to deformation is prevented from appearing.

In some embodiments, as shown in FIG. 2, FIG. 9 and FIG. 10, a docking hole 213 is defined by the tail end 21*b* of the first shell 21 and the tail end 22*b* of the second shell 22 cooperatively.

In some embodiments, as shown in FIG. 2, FIG. 9 and FIG. 10, the cleaning brush main body 100 further includes an extension rod 60. One end of the extension rod 60 is inserted through the docking hole 213. An internal thread 2131 is formed on an inner wall surface of the docking hole 213, and one end of the extension rod 60 is provided with an external thread matching the internal thread 2131. Therefore, one end of the extension rod 60 is fixedly connected to a tail end of the outer shell 20 through threaded fit. When a floor needs to be cleaned with the cleaning brush 900, the extension rod 60 can be used to adjust a position of the brush body 800, thereby avoiding the need for users to bend over or squat down to hold the outer shell 20. Understandably, in scenes such as washing dishes, washing stoves, washing bathtubs and the like, the outer shell 20 of the cleaning brush main body 100 can be directly held for cleaning. While in scenes of cleaning wall dust, floors, corners and the like, the extension rod 60 can be connected at the tail end of the outer shell 20 to increase an overall length of the cleaning brush main body 100, so as to facilitate cleaning.

In some embodiments, as shown in FIG. 2, the outer shell 20 further includes a tail cover 26. The tail cover 26 surrounds an outer periphery of the tail end 21*b* of the first shell 21 and the tail end 22*b* of the second shell 22. A resisting force on the outer periphery of the first shell 21 and the second shell 22 is generated by the tail cover 26, and a support is provided to the tail end 21*b* of the first shell 21 and the tail end 22*b* of the second shell 22 from an outer periphery side, thereby avoiding the tail end 21*b* of the first shell 21 and the tail end 22*b* of the second shell 22 from being deformed outwards due to a pressure of the extension rod 60, and preventing the extension rod 60 from being loosened from the outer shell 20.

In some embodiments, the outer shell 20 presents a narrowed transition from the front end to the tail end, so an outer diameter of the tail end is smaller than an outer diameter of the front end. Therefore, a large accommodation space 231 can be provided at the front end of the outer shell 20, to accommodate the planetary gear set 40 and the drive motor 30. The outer shell 20 is contracted toward the tail end to reduce a volume of the outer shell 20 and facilitate a hand to hold a part of the outer shell 20 near the tail end.

Figure 3:
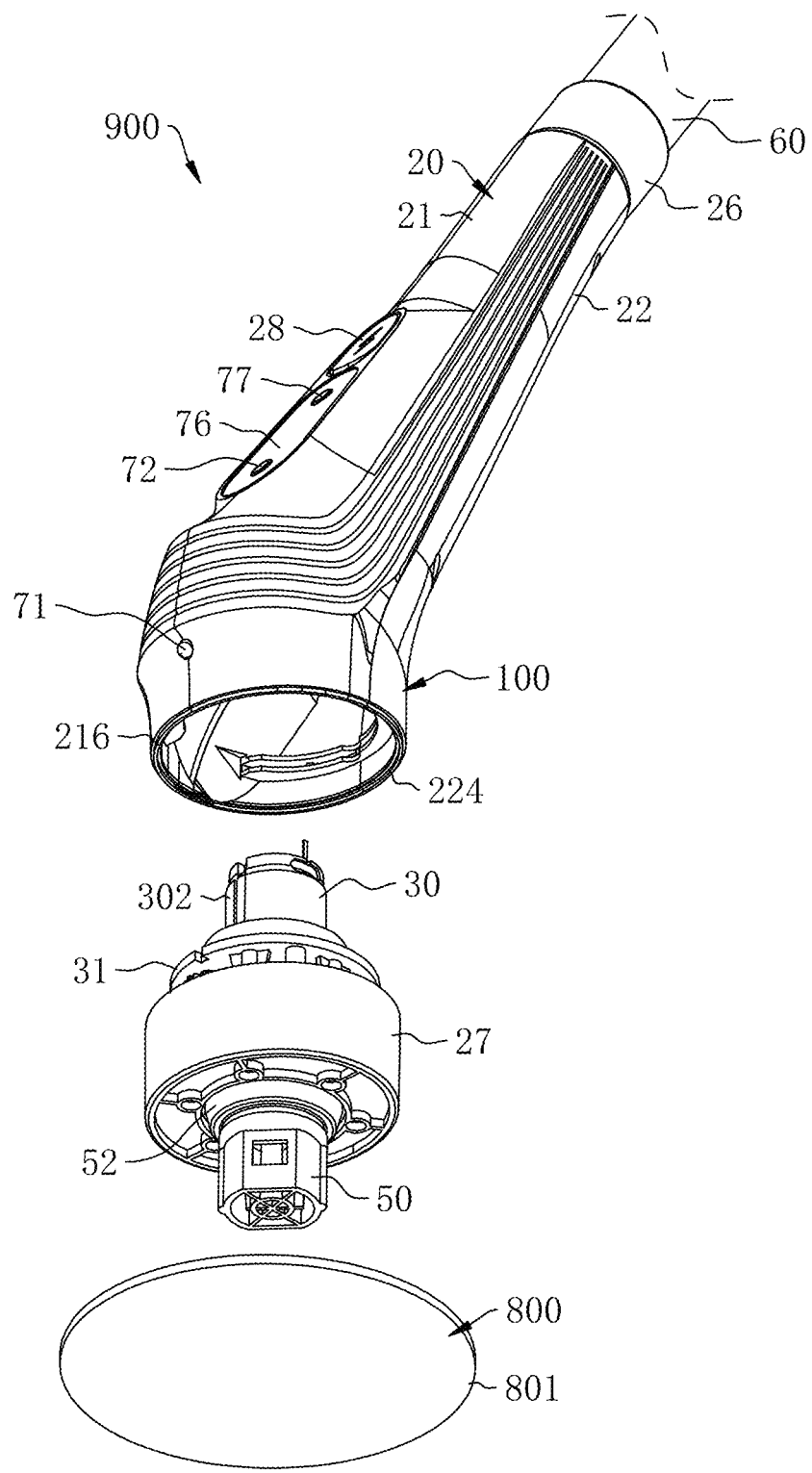
FIG. 3 is an exploded schematic view of the cleaning brush shown in FIG. 1 from yet another angle.

In some embodiments, as shown in FIG. 3, the outer shell 20 presents a bent transition from the front end to the tail end, so that an angle of a part of the outer shell 20 that can be held by the hand relative to the brush body 800 can be adjusted, thereby allowing the hand to hold the outer shell 20 at a more comfortable angle.

Figure 8:
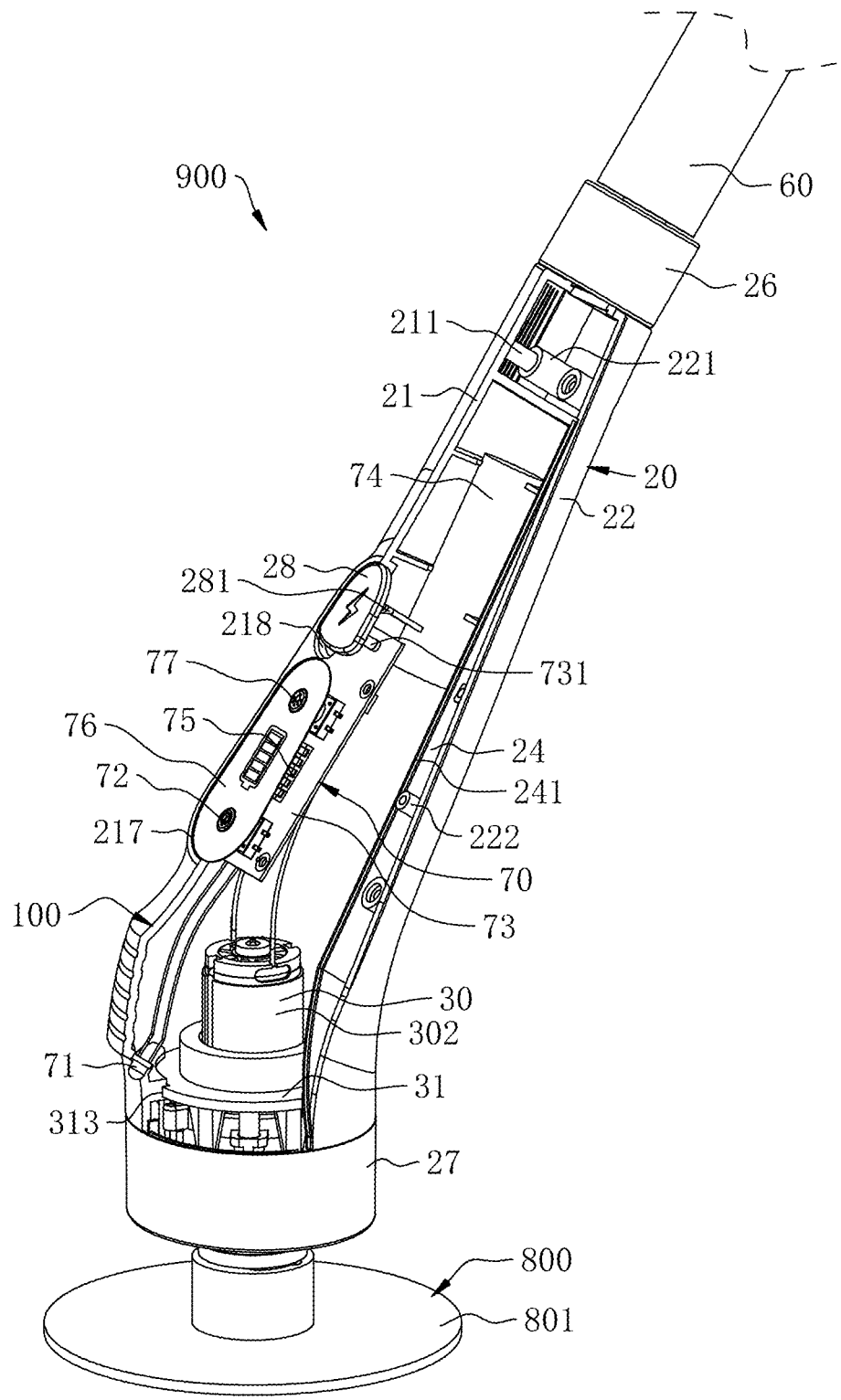
FIG. 8 is a partial schematic view of the cleaning brush shown in FIG. 1.

In some embodiments, as shown in FIG. 8, the outer shell 20 further includes a front cover 27, and the front end of the outer shell 20 abuts against the front cover 27. Specifically, an edge of the front end 21*a* of the first shell 21 and an edge of the front end 22*a* of the second shell 22 abuts against the front cover 27 respectively.

Figure 4:
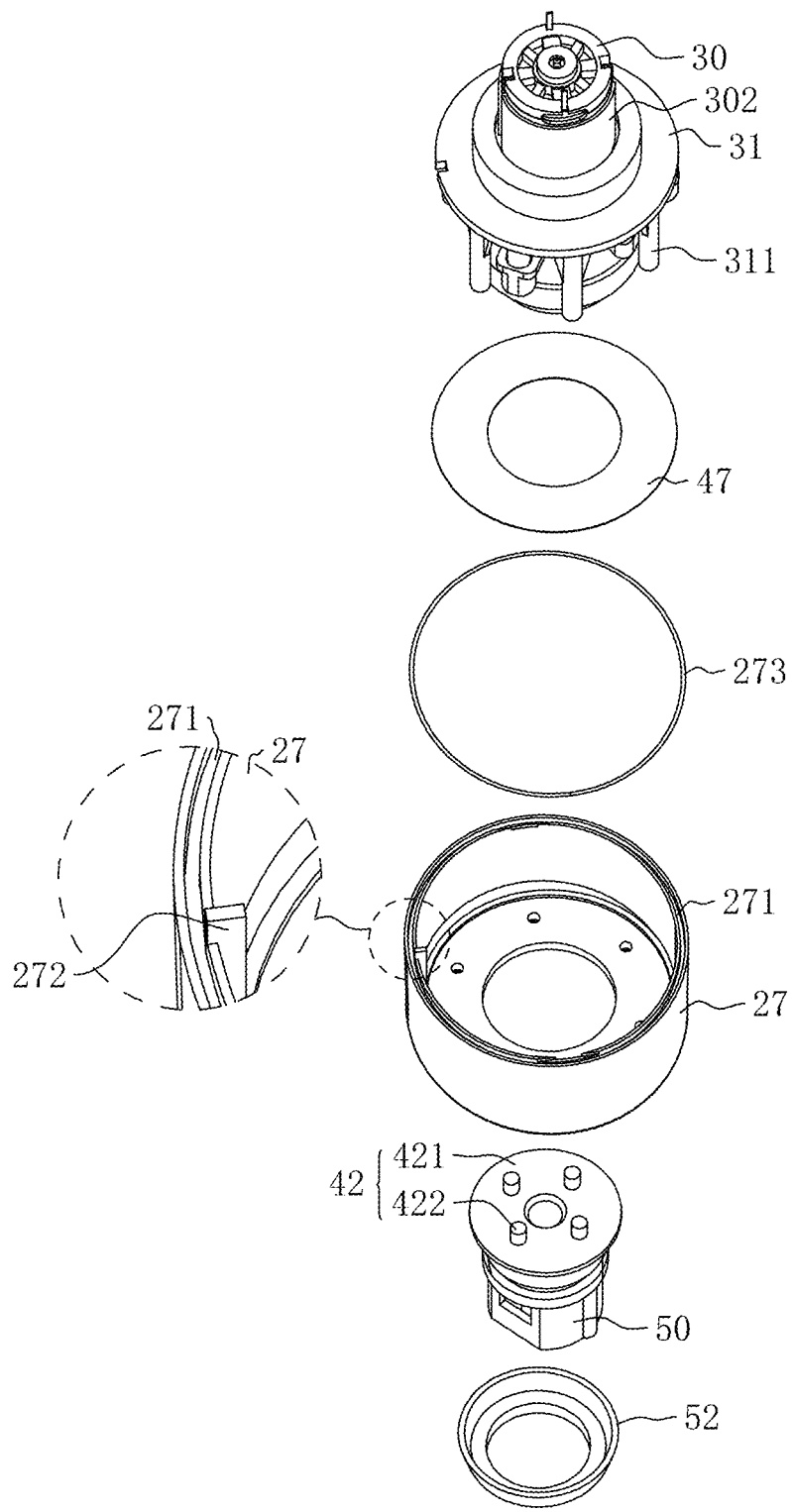
FIG. 4 is an exploded schematic view after an output connector, a front cover and a planetary gear set shown in FIG. 3 are separated from each other.

In some embodiments, as shown in FIG. 4, an edge of the front cover 27 is provided with a second edge recessed groove 271, and an inner space of the second edge recessed groove 271 is annular. A third sealing element 273 is accommodated in the second edge recessed groove 271. As shown in FIG. 9 and FIG. 10, a second edge convex part 216 is formed at the front end 21*a* of the first shell 21, and a third edge convex part 224 is formed at the front end 22*a* of the second shell 22. The second edge convex part 216 and the third first edge convex part 224 are respectively embedded in the second edge recessed groove 271 from different circumferential positions, and abut against the third sealing element 273, therefore, the third sealing element 273 can be used to fill a gap between the first shell 21 and the front cover 27, and a gap between the second shell 22 and the front cover 27, and the accommodation space 231 defined by the front cover 27, the first shell 21 and the second shell 22 has better sealing performance. In some embodiments, the third sealing element 273 is made of rubber, silica gel or other flexible sealing materials. In some embodiments, the third sealing element 273 is annular.

In some embodiments, an intersection of the first shell 21, the second shell 22 and the front cover 27 is covered with silica gel or other sealing materials, therefore, in the case where there is an assembly gap or a gap caused by other stresses at the intersection, an operation of the drive motor 30 and a circuit board 73 can be prevented from being affected by entering water.

In some embodiments, as shown in FIG. 4 to FIG. 9, an inner side wall of the front cover 27 is connected with a second positioning block 272, and the outer shell 20 is provided with a third positioning groove 215 to accommodate the second positioning block 272. By placing the second positioning block 272 in the third positioning groove 215, an angle of the front cover 27 relative to the outer shell 20 can be limited, which is conducive to accurately complete the assembly of the cleaning brush main body 100. In some embodiments, the third positioning groove 215 is located on the first shell 21.

In some embodiments, as shown in FIG. 4 to FIG. 7, the cleaning brush main body 100 further includes a limit bracket 31. The limit bracket 31 is connected between the drive motor 30 and the outer shell 20. A position of the limit bracket 31 is limited by the positioning of the outer shell 20. In the case where the drive motor 30 is connected to the limit bracket 31, the drive motor 30 can be in a stable position in the outer shell 20.

In some embodiments, as shown in FIG. 3, FIG. 9 and FIG. 10, an axial positioning groove 25 is provided on an inner surface of the outer shell 20. An inner space of the axial positioning groove 25 surrounds the drive motor 30 in a circumferential direction. An outer periphery of the limit bracket 31 is placed in the axial positioning groove 25, thereby preventing the limit bracket 31 from moving along an axial or radial direction. In some embodiments, a size of the outer diameter of the axial positioning groove 25 corresponds to an outer diameter of the outer periphery of the limit bracket 31. In some embodiments, the axial positioning groove 25 is formed on each of the inner surface of the first shell 21 and the inner surface the second shell 22. In some embodiments, an opening of the axial positioning groove 25 is oriented towards the center of the outer shell 20. In some embodiments, the opening of the axial positioning groove 25 located on the first shell 21 is oriented towards the inner surface of the second shell 22. The opening of the axial positioning groove 25 located on the second shell 22 is oriented towards the inner surface of the first shell 21.

Figure 6:
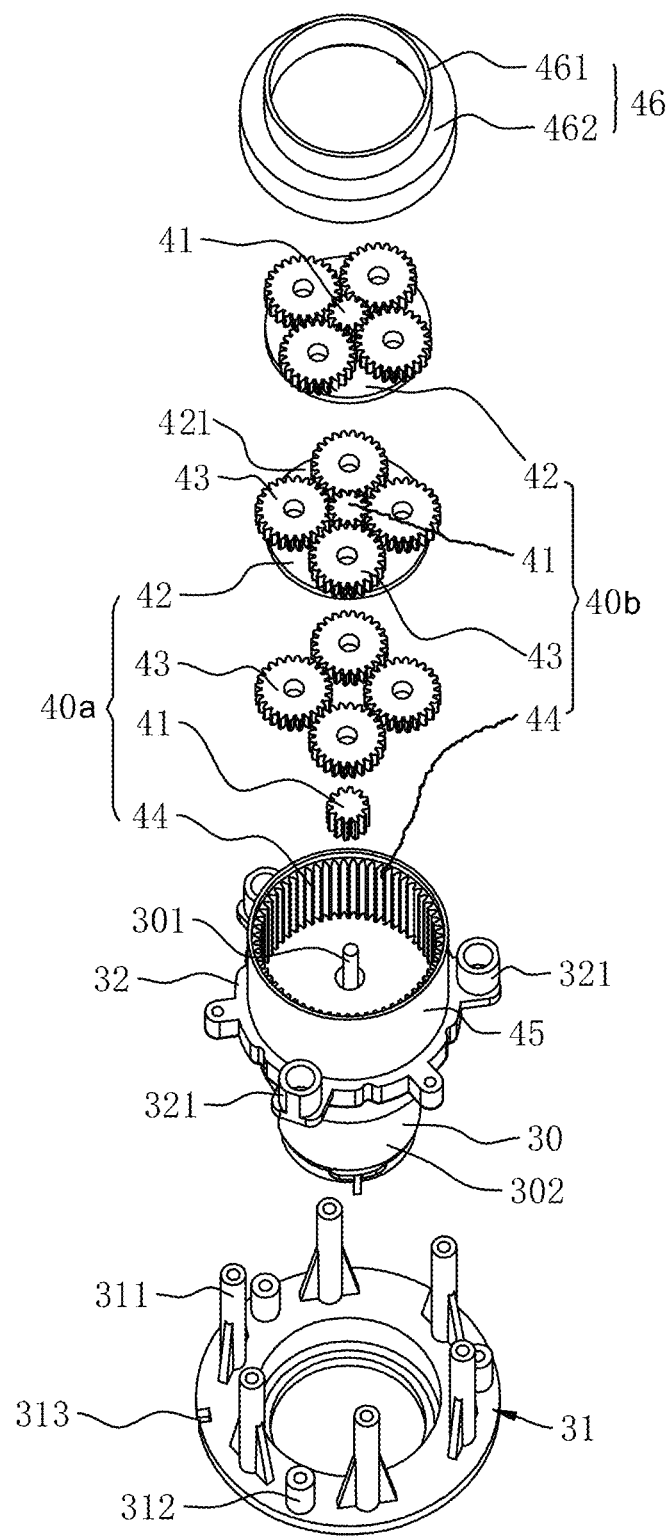
FIG. 6 is an exploded schematic view of a limit bracket, a case cover and the planetary gear set shown in FIG. 5.

In some embodiments, a positioning structure is formed between the outer shell 20 and the limit bracket 31, and the positioning structure can limit the rotation of the limit bracket 31 relative to the outer shell 20, thereby preventing the limit bracket 31 from shifting relative to the outer shell 20 due to a force transmission function of the drive motor 30. In some embodiments, as shown in FIG. 6, FIG. 8 and FIG. 9, a first positioning groove 313 is provided on the outer periphery of the limit bracket 31. The outer shell 20 is provided with a first positioning block 242, and the first positioning block 242 is accommodated in the axial positioning groove 25. The first positioning block 242 is configured to be correspondingly embedded in the first positioning groove 313. In some other embodiments, the outer periphery of the limit bracket 31 and the inner space of the axial positioning groove 25 are elliptical respectively.

In some embodiments, the front cover 27 is connected to the limit bracket 31 by a fastener, therefore, the front cover 27 can be fixed relative to the first shell 21 and the second shell 22. In some embodiments, the limit bracket 31 is provided with a third connecting column 311. The fastener is inserted through the front cover 27 and threadedly inserted through the third connecting column 311.

Figure 5:
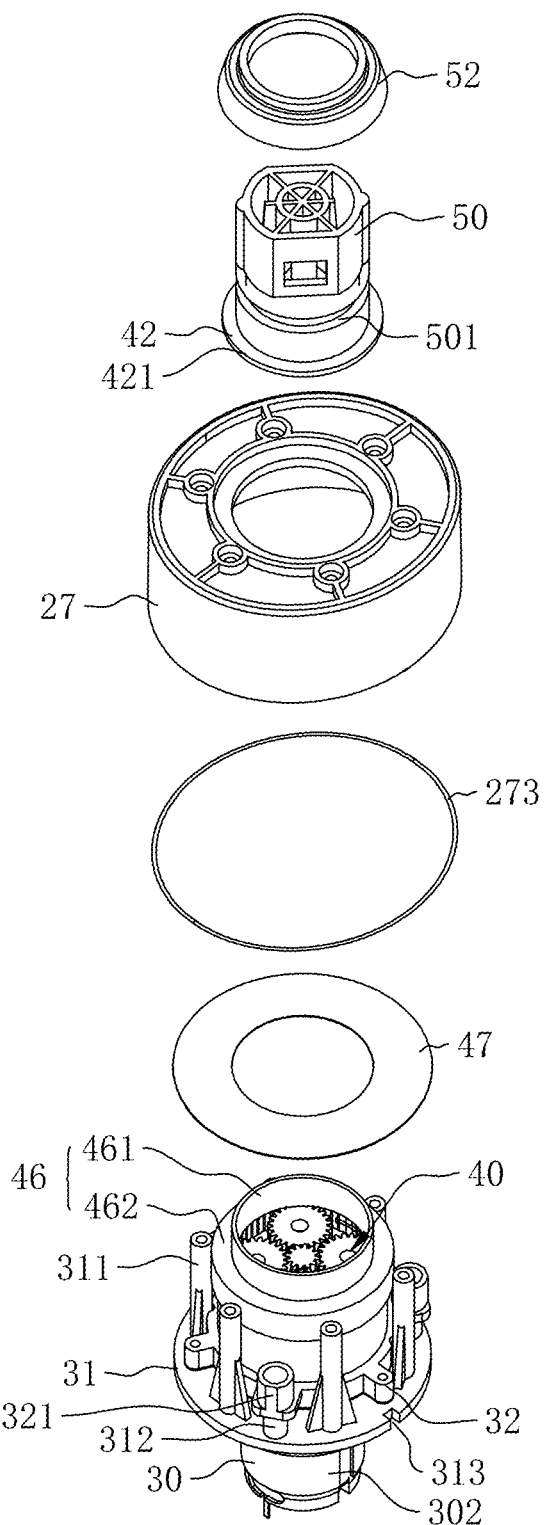
FIG. 5 is an exploded schematic view after the output connector, the front cover and the planetary gear set shown in FIG. 3 are separated from each other from yet another angle.

In some embodiments, as shown in FIG. 5 and FIG. 6, the cleaning brush main body 100 further includes a fixed bracket 32, and the fixed bracket 32 is connected between the drive motor 30 and the limit bracket 31. In some embodiments, the drive motor 30 is fixedly embedded in the fixed bracket 32. In some other embodiments, a main body of the drive motor 30 includes a stepped transition surface facing away from the front cover 27, and the fixed bracket 32 abuts against the stepped transition surface, therefore, the drive motor 30 is limited between the fixed bracket 32 and the front cover 27.

In some embodiments, as shown in FIG. 5 and FIG. 6, a lug part 321 is formed on an outer periphery of the fixed bracket 32, and the lug part is configured to dock with the limit bracket 31. In some embodiments, the limit bracket 31 is provided with a fourth connecting column 312. One of the lug part and the fourth connecting column 312 is provided with a mounting hole, and the other one is provided with a screw hole, a fastener is inserted into the mounting hole and the screw hole, therefore, a fixed position is maintained between the fixed bracket 32 and the limit bracket 31.

Figure 7:
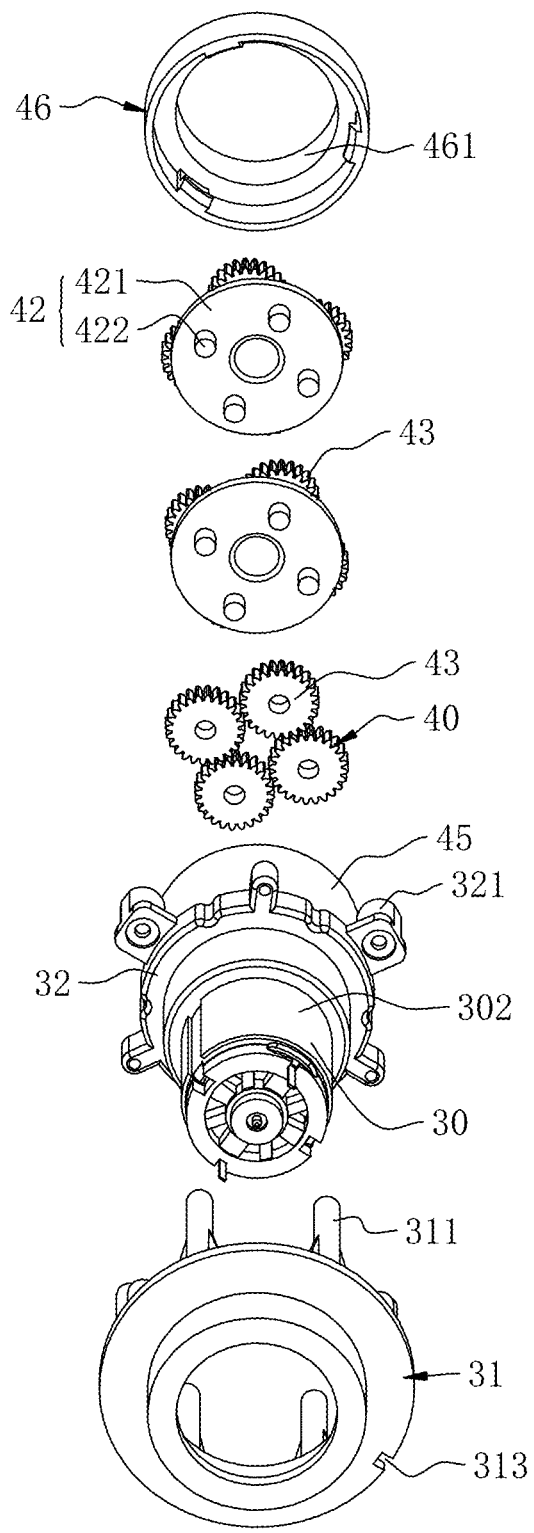
FIG. 7 is an exploded schematic view of the limit bracket, the case cover and the planetary gear set shown in FIG. 5 from yet another angle.

In some embodiments, as shown in FIG. 6 and FIG. 7, the planetary gear set 40 includes a sun gear 41, an inner gear ring 44, a rotating carrier 42 and at least one planetary gear 43. The at least one planetary gear 43 is located between an outer periphery of the sun gear 41 and an inner periphery of the inner gear ring 4, and the at least one planetary gear 43 is meshed with the sun gear 41. The inner gear ring 44 is meshed with the at least one planetary gear 43. The sun gear 41 of one of the planetary gear set 40 is coupled to an output shaft 301 of the drive motor 30. The at least one planetary gear 43 of a same or another planetary gear set 40 is coupled to one end of the output connector 50.

Specifically, in the planetary gear set 40 of a same stage, when the sun gear 41 rotates, since the at least one planetary gear 43 is meshed between the sun gear 41 and the inner gear ring 44, the at least one planetary gear 43 not only performs a rotation movement around a central axis thereof, but also performs a revolution movement around a central axis of the sun gear 41. Specifically, the central axis of the sun gear 41 is coincident with a central axis of the drive motor 30. Specifically, an inner circumferential side of the inner gear ring 44 is meshed with the at least one planetary gear 43. A central axis of the inner gear ring 44 is coincident with the central axis of the drive motor 30.

In one embodiment, a module of the sun gear 41 is 0.6, and a number of teeth is 12. A module of the at least one planetary gear 43 is 0.6, and a number of teeth is 24. A module of the inner gear ring 44 is 0.6, and a number of teeth is 60. In some other embodiments, the module or the number of teeth of each of the sun gear 41, the at least one planetary gear 43 and the inner gear ring 44 can be adjusted according to a size of the planetary gear set 40 or needs for torque transmission.

In some embodiments, one planetary gear set 40 is located between the output shaft 301 of the drive motor 30 and the output connector 50. In the planetary gear set 40, the sun gear 41 of the planetary gear set 40 is anti-rotationally coupled to the output shaft 301 of the drive motor 30. The at least one planetary gear 43 of the planetary gear set 40 is coupled to one end of the output connector 50. Specifically, the sun gear 41 is fixedly sleeved on the output shaft 301 of the drive motor 30.

In some embodiments, as shown in FIG. 6 and FIG. 7, two or more planetary gear sets 40 are located between the output shaft 301 of the drive motor 30 and the output connector 50. More than two planetary gear sets 40 form a sequential transfer cooperation between the output shaft 301 of the drive motor 30 and the output connector 50. Specifically, in a transmission process, the planetary gear set 40 of a previous stage is closer to the drive motor 30 than the planetary gear set 40 of a subsequent stage. The planetary gear set 40 of the subsequent stage is closer to the output connector 50 than the planetary gear set 40 of the previous stage. In some embodiments, the sun gear 41 of the planetary gear set 40 of a foremost stage is fixedly sleeved on the output shaft 301 of the drive motor 30.

Specifically, by increasing a number of the planetary gear set 40, the torque of the output connector 50 can be increased, therefore, the output connector 50 has a larger torque when a maximum power of the drive motor 30 is limited. Specifically, during design, the number of the planetary gear set 40 can be determined according to an intended application of the cleaning brush main body 100. In some embodiments, the cleaning brush main body 100 is used for dish washing, wall dust cleaning, desktop dust cleaning and other scenes with less stress, when designing, the number of the planetary gear set 40 can be determined as two. In some other embodiments, the cleaning brush main body 100 is used for cooking stove, ground cleaning, corner cleaning, toilet washing and other scenes with large stress, when designing, the number of the planetary gear set 40 can be determined as three. In some embodiment, the sun gears 41 belonging to different planetary gear sets 40 are consistent in the number of teeth and the module. In some embodiment, the at least one planetary gears 43 belonging to different planetary gear sets 40 are consistent in the number of teeth and the module.

In some embodiment, when at least one planetary gear set 40 is located between one planetary gear set 40 and the output connector 50, an angular velocity of revolution movement of the at least one planetary gear 43 of the previous planetary gear set 40 is equal to an angular velocity of the sun gear 41 of a next stage.

In some embodiment, when there is no other planetary gear set 40 between one planetary gear set 40 and the output connector 50, an angular velocity of revolution movement of the at least one planetary gear 43 of the one planetary gear set 40 is equal to an angular velocity of the output connector 50.

In some embodiment, a side of the rotating carrier 42 facing away from the drive motor 30 is fixedly connected to the sun gear 41 in another planetary gear set 40. Further, the sun gear 41 is connected to a center of mass position on one side of the rotating carrier 42. In some embodiment, as shown in FIG. 4, FIG. 6 and FIG. 7, the rotating carrier 42 includes a plate body 421 and a plurality of columnar parts 422 connected to one side of the plate body 421. A number of the plurality of columnar parts 422 corresponds to the number of the at least one planetary gear 43. Each columnar part 422 is rotatably inserted into one of the at least one planetary gears 43 in a same planetary gear set 40. Therefore, when the at least one planetary gear 43 revolves around the central axis of the sun gear 41, the rotating carrier 42 is driven to rotate by the at least one planetary gear 43 through the plurality of columnar parts, and thus an angular velocity of the rotating carrier 42 is equal to the angular velocity of the revolution movement of the at least one planetary gear 43. More specifically, the plurality of columnar parts 422 are rotatably inserted at a circle center position of the at least one planetary gear 43. The other side of the plate body 421 is connected to the sun gear 41 in another planetary gear set 40. In some embodiments, each planetary gear set 40 is provided with four planetary gears 43, the rotating carrier 42 is provided with four columnar parts 422, therefore, a torque and a friction force of the planetary gear 43 can be dispersed, the friction force and the torque of a single planetary gear 43 can be reduced, and a service life of the planetary gear 43 can be improved.

In some other embodiments, as shown in FIG. 4, in the case where there is no other planetary gear set 40 between the other side of the rotating carrier 42 and the output connector 50, the other side of the rotating carrier 42 is fixedly connected to the output connector 50. Specifically, the other side of the plate body 421 of the rotating carrier 42 is connected to the output connector 50.

In some embodiments, in the case where there is only one planetary gear 43 between the outer periphery of the sun gear 41 and the inner periphery of the inner gear ring 44, a radial limit fit is formed by a center of the rotating carrier 42 and a center position of the sun gear 41, therefore, a central axis of the rotating carrier 42 and a central axis of the sun gear 41 coincide with each other. In some embodiments, the rotating carrier 42 can be provided with a column structure at the center position thereof for being rotatably inserted into the sun gear 41, therefore, in the case of only a single intermediate gear, a rotating axis line of the rotating carrier 42 can be kept stable.

In some embodiments, in the case where there is two or more planetary gears 43 between the outer periphery of the sun gear 41 and the inner periphery of the inner gear ring 44, the two or more planetary gears 43 are evenly distributed around the outer periphery of the sun gear 41, therefore, a force between the rotating carrier 42 and the two or more planetary gears 43 is more balanced.

In some embodiments, as shown in FIG. 7, the rotating carrier 42 disposed in different planetary gear sets 40 can adopt a same shape structure.

In some embodiments, as shown in FIG. 5 and FIG. 6, the cleaning brush main body 100 further includes a machine case 45. The planetary gear set 40 is located in the machine case 45. The inner gear ring 44 is fixed to an inner peripheral wall of the machine case 45. Since the inner gear ring 44 is fixed to the inner peripheral wall of the machine case 45, an operation of installing the inner gear ring 44 into the machine case 45 is eliminated, which is conducive to simplifying an assembly of the planetary gear set 40. In some embodiments, the inner gear ring 44 is formed inside the machine case 45 by machining a gear texture on an inner wall of an embryo body of the machine case 45. In some embodiments, the machine case 45 is fixedly disposed relative to a main body 302 of the drive motor 30. In some embodiments, the inner gear rings 44 belonging to different planetary gear sets 40 are consistent in the number of teeth, the module and the circumferential angle. Therefore, an inner gear ring 44 with a relatively large axial length is formed by a plurality of inner gear rings 44 on the inner peripheral wall of the machine case 45, so it can be understood that a plurality of planetary gear sets 40 share one inner gear ring 44.

In some embodiments, shown in FIG. 6, the at least one stage of planetary gear set 40 includes a first stage planetary gear set 40a. The first stage planetary gear set 40a includes a sun gear 41, an inner gear ring 44, a rotating carrier 42 and at least one planetary gear 43. The sun gear 41 is anti-rotationally coupled to the output shaft 301 of the drive motor 30. The at least one planetary gear 43 can be rotatably supported on the rotating carrier 42, and two sides of the planetary gear 43 are respectively meshed with an outer periphery of the sun gear 41 and an inner periphery of the inner gear ring 44. Specifically, the rotating carrier 42 is coupled to the output connector 50, or the rotating carrier 42 of the first stage planetary gear set 40a is coupled to the planetary gear set 40 of the next stage.

In some embodiments, the at least one stage of planetary gear set 40 further includes a second stage planetary gear set 40b. The second stage planetary gear set 40b includes a sun gear 41, an inner gear ring 44, a rotating carrier 42 and at least one planetary gear 43. The sun gear 41 of the second stage planetary gear set 40b is anti-rotationally coupled to the rotating carrier 42 of the first stage planetary gear set 40a, the at least one planetary gear 43 of the second stage planetary gear set 40b can be rotatably supported on the rotating carrier 42 of the second stage planetary gear set 40b, and two sides of the planetary gear 43 of the second stage planetary gear set 40b are respectively meshed with an outer periphery of the sun gear 41 and an inner periphery of the inner gear ring 44 of the second stage planetary gear set 40b. Specifically, the rotating carrier 42 of the second stage planetary gear set 40b is coupled to the output connector 50, or, the rotating carrier 42 of the second stage planetary gear set 40b is coupled to the planetary gear set 40 of the next stage. In the present embodiment, the inner gear ring 44 of the first stage planetary gear set 40a and the inner gear ring 44 of the second stage planetary gear set 40b are an integral structure. In other embodiment, the inner gear ring 44 of the first stage planetary gear set 40a and the inner gear ring 44 of the second stage planetary gear set 40b can also be arranged separately, and respectively fixed relative to the machine case 45.

In some embodiments, the output connector 50 is in a cylindrical shape. One end of the output connector 50 is coupled to the as least one planetary gear 43. A nested fit is formed between the other end of the output connector 50 and the brush body 800.

The output connector 50 and the front cover 27 are respectively made of hard materials, and a gap between the output connector 50 and the front cover 27 is difficult to eliminate. In some embodiments, as shown in FIG. 3 and FIG. 5, a second sealing element 52 is sleeved on an outer periphery of the output connector 50. The second sealing element 52 abuts against an outer surface of the outer shell 20, therefore, the second sealing element 52 can play a sealing role between the output connector 50 and the outer shell 20, to prevent the water flow from entering the outer shell 20 through the gap between the output connector 50 and the outer shell 20. In some embodiments, an inner peripheral part of the second sealing element 52 is interference-fitted with the outer periphery of the output connector 50, therefore, the second sealing element 52 can be closely attached to the outer periphery of the output connector 50.

In some embodiments, a friction force between the second sealing element 52 and the output connector 50 is greater than a friction force between the second sealing element 52 and the outer surface of the outer shell 20, and thus the second sealing element 52 rotates with the output connector 50.

In some embodiments, as shown in FIG. 5, a positioning installation groove 501 is provided on the outer peripheral side of the output connector 50, and the positioning installation groove 501 is arranged around the outer periphery of the output connector 50. The inner peripheral part of the second sealing element 52 is accommodated in the positioning installation groove 501. A width of the positioning installation groove 501 along an axial direction corresponds to a width of the inner peripheral part of the second sealing element 52, therefore, a position of the second sealing element 52 can be limited along the axial direction of the output connector 50, which is conducive to the second sealing element 52 stably abutting against the outer surface of the outer shell 20.

In some embodiments, the second sealing element 52 is made of a soft silica gel material, therefore, the second sealing element 52 can be inserted into the positioning installation groove 501 through tensile deformation.

In some embodiments, as shown in FIG. 4 and FIG. 5, along a direction close to the outer surface of the outer shell 20, an outer wall of the second sealing element 52 is arranged in an expanded transition. The outer wall of the second sealing element 52 is expanded in the axial direction to form a large end and a small end. The large end of the second sealing element 52 forms an annular plane, and the plane abuts against the outer surface of the outer shell 20. In some embodiments, the plane abuts against an outer surface of the front cover 27. In a static state, under extrusion of the large end of the second sealing element 52, the water flow can be prevented from flowing into the gap between the output connector 50 and the outer shell 20. After the drive motor 30 is running, the second sealing element 52 is rotated together with the output connector 50, due to a slight deformation of the outer wall of the second sealing element 52, the large end of the second sealing element 52 is squeezed by the outer wall of the second sealing element 52, a centripetal pressure perpendicular to the outer surface of the front cover 27 on the large end of the second sealing element 52 is generated, and the large end of the second sealing element 52 is subjected to a friction force of a positive plane of the front cover 27. Thus, when the output connector 50 and the second sealing element 52 are in a rotating state, domestic flushing water can be prevented from entering the gap between the output connector 50 and the outer shell 20 by a gap between the second sealing element 52 and the front cover 27. Therefore, a waterproof structure is formed between the output connector 50, the second sealing element 52, the drive motor 30 and the front cover 27.

In some embodiments, as shown in FIG. 5 and FIG. 6, the cleaning brush main body 100 further includes a case cover 46. A space being able to accommodate the planetary gear set 40 is defined by the case cover 46 and the machine case 45 cooperatively. The output connector 50 is rotatably inserted through the case cover 46. In some embodiments, the machine case 45 abuts between the main body 302 of the drive motor 30 and the case cover 46.

In some embodiments, as shown in FIG. 5 to FIG. 7, the case cover 46 includes an inner cylindrical part 461 and a ring body part 462 connected to an outer periphery of the inner cylindrical part 461. The inner cylindrical part 461 is positioned and inserted into the front cover 27 of the outer shell 20. The output connector 50 is rotatably inserted through the inner cylindrical part 461. The ring body part 462 is accommodated in the outer shell 20 and is disposed opposite to the interior of the machine case 45. A fourth sealing element 47 abuts between an outer surface of the ring body part 462 and the front cover 27, and the fourth sealing element 47 is in a thin ring shape. The fourth sealing element 47 is disposed around the inner cylindrical part 461 and abuts between the ring body part 462 and the inner surface of the front cover 27, thereby preventing the water flow from flowing through the gap between the case cover 46 and the front cover 27. Therefore, another waterproof structure is formed between the fourth sealing element 47, the case cover 46 and the front cover 27. When the second sealing element 52 fails due to deformation by external force, the fourth sealing element 47 can prevent the water flow from entering the outer shell 20. In some embodiments, the fourth sealing element 47 is EVA cotton. In some embodiments, two surfaces of the fourth sealing element 47 are bonded to the outer surface of the ring body part 462 and the front cover 27 respectively.

In some embodiments, as shown in FIG. 5, the fourth sealing element 47 also abuts between one end of the third connecting column 311 and the front cover 27, thereby preventing liquid from flowing into the outer shell 20 through a gap between one end of the third connecting column 311 and the front cover 27. Specifically, one end of the third connecting column 311 is fixed to the front cover 27 through a fastener.

In some embodiments, as shown in FIG. 1 and FIG. 2, the brush body 800 includes a brush disk 801 detachably connected to the output connector 50 and a brush head connected to the brush disk 801. The brush disk 801 is used to support the brush head. The brush head is used to contact a surface of a position to be cleaned. In some embodiments, the brush head is connected to the brush disk 801 through a magic sticker with strong adhesion. In some embodiments, the brush head is provided with sponge or soft cloth and is used for washing dishes, cleaning dust or sweeping the floor. In some other embodiments, the brush head is a bristle brush and is used for scrubbing toilets, scrubbing bathrooms, cleaning stains on stoves or scrubbing bathtubs. In some embodiments, the brush disk 801 is in a circular disk shape.

In some embodiments, as shown in FIG. 8, the cleaning brush main body 100 further includes a light emitting element 71 installed on the outer shell 20. The light emitting element 71 can generate illumination light rays beamed toward the outer peripheral side of the output connector 50. When the output connector 50 is installed with the brush body 800, the outer peripheral side of the brush body 800 can be irradiated by the illumination light rays, thereby helping a user to clearly see stains around the brush body 800. In some embodiments, the light emitting element 71 is embedded in the first shell 21. In some embodiments, the light emitting element 71 adopts a straw hat LED lamp or other electronic components being able to generate the illumination light rays.

In some embodiments, the light emitting member 71 is disposed close to the front end of the outer shell 20. In some embodiments, a gap between the light emitting element 71 and the first shell 21 is filled with silica gel or other sealing materials, to prevent water from entering a hole on the first shell 21 corresponding to the light emitting element 71.

In some embodiments, as shown in FIG. 8, the cleaning brush main body 100 further includes an electrical component 70, the electrical component 70 is at least used to control the operation of the drive motor 30, and the drive motor 30 can be controlled by the user through operating the electrical component 70.

In some embodiments, as shown in FIG. 8, the electrical component 70 includes a main switch 72, a circuit board 73 and an energy storage element 74. The circuit board 73 is electrically connected to the main switch 72 and the energy storage element 74. The circuit board 73 is also electrically connected to the drive motor 30. In some embodiments, the main switch 72 is partially exposed outside the outer shell 20, so that it can be operated from the outside of the outer shell 20. In some embodiments, the energy storage element 74 is electrically connected to the circuit board 73 by a positive wire and a negative wire. In some embodiments, the positive wire and the negative wire are conductors. In some embodiments, the drive motor 30 is electrically connected to the circuit board 73 through a positive conducting wire and a negative conducting wire. In some embodiments, the positive conducting wire and the negative conducting wire are conductors. In some embodiments, the energy storage element 74 is a battery. In some embodiments, the circuit board 73 is accommodated in the accommodation space 231.

In some embodiments, as shown in FIG. 8, the electrical component 70 further includes a power indicator light 75 and a light-transmitting switch cap 76. The power indicator light 75 is electrically connected to the circuit board 73. The power indicator light 75 and the light-transmitting switch cap 76 are installed on the outside of the outer shell 20. In some embodiments, the power indicator light 75 and the light-transmitting switch cap 76 are installed in a slot 217 outside the first shell 21. A space for accommodating the power indicator light 75 is defined by the first shell 21 and the light-transmitting switch cap 76 cooperatively. In some embodiments, the power indicator light 75 is an LED light. In some embodiments, the light-transmitting switch cap 76 is made of a transparent PVC material. A strong double-sided tape is adhered near the slot 217 outside the first shell 21, to bond the light-transmitting switch cap 76 to a plane of the first shell 21 outside the slot 217, thereby achieving a purpose of waterproofing and assembly.

When the cleaning brush main body 100 is used, the main switch 72 is long pressed to start the circuit board 73, and the energy storage element 74 supplies power to the circuit board 73. After the circuit board 73 is started, the power indicator light 75 turns on, and a light state of the power indicator light 75 can be seen through a transparent area of the light-transmitting switch cap 76, thereby prompting the user that the cleaning brush main body 100 has been started.

When the main switch 72 is pressed again, the drive motor 30 is started, and the drive motor 30 rotates at a low speed. After the main switch 72 is pressed for the third time, the drive motor 30 is switched to high-speed rotation, a power output is maximized, and a current on the energy storage element 74, the positive wire and the negative wire of the wire, and the positive conducting wire and the negative conducting wire of the drive motor 30 reaches the maximum. By pressing the main switch 72, the drive motor 30 can be switched between low-speed rotation and high-speed rotation, to meet needs of different usage scenarios. When the main switch 72 is pressed for a long time, a circuit of the board circuit 73 can be closed, causing the drive motor 30 to stop running.

In some embodiments, after the circuit board 73 is started by pressing the main switch 72, a power status of the energy storage element 74 can be seen from a power area of the light-transmitting switch cap 76. In some embodiments, there are five power indicator lights 75. If all five power indicator lights 75 are on, the energy storage element 74 is in a state close to 100% full charge. If four power indicator lights 75 are on, the energy storage device is in a state close to 80% power, and the sequence is calculated sequentially. If only one power indicator light 75 is on, a light-emitting area accounts for about 20% of the power area, and the energy storage element 74 is close to or less than about 20% power, the user can be reminded to charge in time after use.

In order to adapt to use requirements of various scenarios, the cleaning brush main body 100 can adopt two strategies to adjust the output torque of the drive motor 30: first, during a design process, a number of the planetary gear sets 40 between the output shaft 301 of the drive motor 30 and the output connector 50 is adjusted, by increasing the number of the planetary gear sets 40, a speed of the output connector 50 can be reduced and the output torque of the output connector 50 can be increased. Second, in scenarios with low torque demand, an input current of the drive motor 30 is reduced, thereby reducing an output power of the drive motor 30 and reducing the output torque.

In some embodiments, as shown in FIG. 8, the electrical component 70 further includes a light switch 77. The circuit board 73 is electrically connected to the light switch 77 and the light emitting element 71 respectively. When cleaning an area with poor lighting, touching the light switch 77 to turn on the light emitting element 71, and the light emitting element 71 is electrically connected to the circuit board 73 through a conductor. A power of the light-emitting element 71 is relatively small, and thus energy consumption of the energy storage element 74 is relatively low. In a cleaning area with relatively bright lighting, illumination of the light-emitting element 71 can be turned off by touching the light switch 77.

In some embodiments, as shown in FIG. 8, the circuit board 73 is provided with a charging interface 731. The charging interface 731 is used to dock with one end of a charging cable to charge the energy storage element 74. In some embodiments, the charging interface 731 is in a form of a USB port. In some embodiments, the outer shell 20 is provided with a reserved opening 218 corresponding to the charging interface 731. The charging interface 731 can be exposed from the outer shell 20 through the reserved opening 218.

In some embodiments, as shown in FIG. 8, the outer shell 20 is connected with a charging waterproof cap 28. When the charging interface 731 does not need to dock with the charging cable, the reserved opening 218 can be covered by the charging waterproof cap 28, thereby preventing the water flow from flowing into the interior of the outer shell 20 through the reserved opening 218. In some embodiments, when the energy storage element 74 needs to be charged, the charging waterproof cap 28 is unscrewed, and one end of the charging cable is inserted into the charging interface 731 for charging. The power indicator light 75 changes dynamically, to prompt the user that charging is in progress. After charging is completed, the charging cable is unplugged, and the charging waterproof cap 28 is covered, to prevent water from entering the charging interface 731 by the charging waterproof cap 28. In some embodiments, the charging waterproof cap 28 is provided with a hook part 281, and the hook part 281 is embedded in the outer shell 20, thereby preventing the charging waterproof cap 28 from being lost due to detachment from the outer shell 20. In some embodiments, the charging waterproof cap 28 can be embedded in the reserved opening 218 through interference fit, to achieve the purpose of waterproofing.

In some embodiments, when the cleaning brush main body 100 is assembled, the drive motor 30 and the planetary gear set 40 are installed on the fixed bracket 32 through the machine case 45. The fixed bracket 32 is assembled with the fourth connecting column 312 of the limit bracket 31 through the lug part 321 thereof, and the drive motor 30, the planetary gear set 40 and the fixed bracket 32 are integrally installed on the limit bracket 31, thereby making an internal structure of the cleaning brush main body 100 simpler and more stable.

In some embodiments, after the first sealing element 236 is assembled in the first edge recessed groove 232 of the first partition wall 23, the circuit board 73 and the light-emitting component 71 are assembled on the first shell 21. Then, electrical circuits of the energy storage element 74, the drive motor 30, and the light emitting element 71 are connected. After the electrical circuits are connected, an entire module of the drive motor 30 and the limit bracket 31 is assembled into the axial positioning groove 25 of the first shell 21, and the first positioning groove 313 of the limit bracket 31 is aligned with the first positioning block 242 in the axial positioning groove 25 of the first shell 21.

After the drive motor 30 and the limit bracket 31 are embedded in the first shell 21, the second shell 22 is closed. The axial positioning groove 25 of the second shell 22 is aligned with the outer periphery of the limit bracket 31, functions of the axial positioning grooves 25 of the first shell 21 and the second shell 22, the first positioning groove 313 on the limit bracket 31, and the first positioning block 242 in the axial positioning groove 25 are as follows: after the drive motor 30 is started, preventing the drive motor 30 and the limit bracket 31 from rotating inside the cleaning brush main body 100, and axially limiting the drive motor 30, at the same time, reducing a stress of the front cover 27 and the limit bracket 31.

In some embodiments, when the first shell 21 and the second shell 22 are docked, the positioning column 222 is aligned with the positioning rod 212, and the positioning protrusion 223 is aligned with the second positioning groove 214, therefore, the first shell 21 and the second shell 22 are guided during docking, and deformation of the first shell 21 and the second shell 22 under stress is avoided.

In some embodiments, after the second connecting column 221 is aligned with the first connecting column 211, the second connecting column 221 and the first connecting column 211 are locked by a fastener. The waterproof fourth sealing element 47 is attached to an inner side of the front cover 27, and the third sealing element 273 is installed in the second edge recessed groove 271 of the front cover 27. The front cover 27 is closed onto the front end 21a of the first shell 21 and the front end 22a of the second shell 22. The intersection of the first shell 21, the second shell 22 and the front cover 27 is covered with silica gel for sealing.

The second edge recessed groove 271 provided with the third sealing element 273 of the front cover 27 is aligned with the second edge convex part 216 of the first shell 21 and the third edge convex part 224 of the second shell 22 respectively, to perform nested matches. Then, a fastener is used to penetrate from the outer surface of the front cover 27 to the third connecting column 311 of the limit bracket 31, to lock the front cover 27 to the limit bracket 31.

The above embodiments are merely to describe preferred embodiments of the present disclosure, not limited to the scope of the present disclosure. Any changes and variations made by those skilled in the art without departing from the spirit and scope of the present disclosure, should be fall into the protection scope of claims of the present disclosure.

The invention claimed is:

1. A cleaning brush main body, comprising:
    an outer shell;
    a drive motor, installed in the outer shell, and comprising an output shaft;
    an output connector, rotatably arranged relative to the outer shell;
    a limit bracket;
    a fixed bracket; and
    at least one stage of planetary gear set, coupled between the output connector and the output shaft of the drive motor; and installed in the outer shell;
    wherein the outer shell comprises a first shell and a second shell;
    the first shell is provided with a first inner cavity, and the second shell is provided with a second inner cavity;
    the first inner cavity is provided with a first opening, and the second inner cavity is provided with a second opening;
    an opening edge of the first shell is docked with an opening edge of the second shell;
    a first partition wall is provided on an inner surface of the first shell, and the first inner cavity of the first shell is divided into a first central area and a first peripheral area by the first partition wall;
    a second partition wall is provided on an inner surface of the second shell, and the second inner cavity of the second shell is divided into a second central area and a second peripheral area by the second partition wall;
    when the first shell is docked with the second shell, an end edge of the first partition wall abuts against an end edge of the second partition wall;
    a second sealing element is sleeved on an outer periphery of the output connector;
    the second sealing element abuts against an outer surface of the outer shell; and
    an outer wall of the second sealing element is arranged in an expanded transition along a direction close to the outer surface of the outer shell;
    the limit bracket is connected between the drive motor and the outer shell;
    an axial positioning groove is provided on an inner surface of the outer shell, and the drive motor is surrounded by an inner space of the axial positioning groove in a circumferential direction;
    an outer periphery of the limit bracket is accommodated in the axial positioning groove;
    the fixed bracket is connected where the drive motor is between the fixed bracket and the limit bracket;
    a lug part is formed on an outer periphery of the fixed bracket, and the lug part is configured to dock with the limit bracket; and
    a fourth connecting column is provided on the limit bracket.

2. The cleaning brush main body of claim 1, wherein the at least one stage of planetary gear set comprises a first stage planetary gear set; and the first stage planetary gear set comprises:
    a sun gear, anti-rotationally coupled to the output shaft of the drive motor;
    an inner gear ring;
    a rotating carrier; and
    at least one planetary gear, rotatably supported on the rotating carrier, and wherein two sides of the at least one planetary gear are meshed with an outer periphery of the sun gear and an inner periphery of the inner gear ring respectively.

3. The cleaning brush main body of claim 2, wherein the at least one stage of planetary gear set further comprises a second stage planetary gear set; and the second stage planetary gear set comprises:
- a rotating carrier;
- a sun gear, anti-rotationally coupled to the rotating carrier of the first stage planetary gear set;
- an inner gear ring; and
- at least one planetary gear, rotatably supported on the rotating carrier of the second stage planetary gear set, and wherein two sides of the at least one planetary gear of the second stage planetary gear set are meshed with an outer periphery of the sun gear of the second stage planetary gear set and an inner periphery of the inner gear ring of the second stage planetary gear set respectively.

4. The cleaning brush main body of claim 3, further comprising a machine case, and wherein:
- the at least one stage of planetary gear set is located in the machine case; and
- the inner gear ring of the first stage planetary gear set and the inner gear ring of the second stage planetary gear are fixedly arranged on an inner peripheral wall of the machine case.

5. The cleaning brush main body of claim 1, further comprising a machine case and a case cover, and wherein:
- the drive motor comprises a main body;
- a space capable of accommodating the at least one stage of planetary gear set is defined by the case cover and the machine case cooperatively;
- the output connector is rotatably inserted through the case cover; and
- the machine case abuts between the main body of the drive motor and the case cover.

6. The cleaning brush main body of claim 5, further comprising a front cover, and wherein:
- the outer shell comprises a front end and a tail end, and the front end of the outer shell abuts against the front cover;
- the case cover comprises an inner cylindrical part and a ring body part connected to an outer periphery of the inner cylindrical part;
- the inner cylindrical part is positioned and inserted into the front cover of the outer shell, and the output connector is rotatably inserted through the inner cylindrical part;
- the ring body part is accommodated in the outer shell, and is disposed opposite to interior of the machine case; and
- a fourth sealing element is abutted between an outer surface of the ring body part and the front cover, the fourth sealing element is in a thin ring shape, the fourth sealing element is disposed around the inner cylindrical part, and abuts between the ring body part and an inner surface of the front cover.

7. The cleaning brush main body of claim 1, wherein:
- the first inner cavity of the first shell is provided with a plurality of first connecting columns extending towards the first opening, and the second inner cavity of the second shell is provided with a plurality of second connecting columns extending towards the second opening; and
- when the first shell is docked with the second shell, the plurality of first connecting columns and the plurality of second connecting columns are aligned and engaged with each other.

8. The cleaning brush main body of claim 7, wherein:
- the plurality of first connecting columns are located on periphery of the first partition wall;
- the plurality of second connecting columns are located on periphery of the second partition wall.

9. The cleaning brush main body of claim 8, wherein:
- one of the end edge of the first partition wall and the end edge of the second partition wall is provided with a first edge recessed groove, and the other one is provided with a first edge convex part;
- the first edge recessed groove is capable of accommodating the first edge convex part; and
- a first sealing element is accommodated in the first edge recessed groove.

10. The cleaning brush main body of claim 7, wherein:
- one of the first shell and the second shell is connected with a positioning column, and the other one is connected with a positioning rod; and
- the positioning rod is inserted into the positioning column.

11. The cleaning brush main body of claim 1, wherein:
- a positioning installation groove is provided on an outer peripheral side of the output connector, and the positioning installation groove is arranged around the outer periphery of the output connector; and
- an inner peripheral part of the second sealing element is accommodated in the positioning installation groove.

12. The cleaning brush main body of claim 1, wherein:
- a first positioning groove is provided on the outer periphery of the limit bracket;
- a first positioning block is provided on the outer shell;
- the first positioning block is accommodated in the axial positioning groove; and
- the first positioning block is configured to be correspondingly embedded in the first positioning groove.

13. The cleaning brush main body of claim 1, further comprising an extension rod, and wherein:
- the outer shell further comprises a tail cover;
- the first shell is provided with a first front end and a first tail end, and the second shell is provided with a second front end and a second tail end;
- the first tail end is arranged away from the output connector relative to the first front end, and the second tail end is arranged away from the output connector relative to the second front end;
- an outer periphery of the first tail end of the first shell and the second tail end of the second shell is surrounded by the tail cover;
- a docking hole is defined by the first tail end of the first shell and the second tail end of the second shell cooperatively; and
- one end of the extension rod is threaded through the docking hole.

14. The cleaning brush main body of claim 13, wherein:
- one of the first tail end of the first shell and the second tail end of the second shell is provided with a positioning protrusion, and the other one is provided with a second positioning groove;
- the second positioning groove is configured to engage the positioning protrusion; and
- an internal thread is formed on an inner wall surface of the docking hole, and one end of the extension rod is provided with an external thread matching the internal thread.

15. A cleaning brush, comprising a brush body and the cleaning brush main body according to claim 1, and wherein the brush body is connected to the output connector.

16. A cleaning brush main body, comprising:
an outer shell;
a drive motor, installed in the outer shell, and comprising an output shaft;
an output connector, rotatably arranged relative to the outer shell;
at least one stage of planetary gear set, coupled between the output connector and the output shaft of the drive motor; and installed in the outer shell;
a limit bracket; and
a fixed bracket;
wherein a second sealing element is sleeved on an outer periphery of the output connector;
the second sealing element abuts against an outer surface of the outer shell; and
an outer wall of the second sealing element is arranged in an expanded transition along a direction close to the outer surface of the outer shell;
the limit bracket is connected between the drive motor and the outer shell;
an axial positioning groove is provided on an inner surface of the outer shell, and the drive motor is surrounded by an inner space of the axial positioning groove in a circumferential direction;
an outer periphery of the limit bracket is accommodated in the axial positioning groove;
the fixed bracket is connected where the drive motor is between the fixed bracket and the limit bracket;
a lug part is formed on an outer periphery of the fixed bracket, and the lug part is configured to dock with the limit bracket; and
a fourth connecting column is provided on the limit bracket.

17. A cleaning brush main body, comprising:
an outer shell;
a drive motor, installed in the outer shell, and comprising an output shaft;
an output connector, rotatably arranged relative to the outer shell;
at least one stage of planetary gear set, coupled between the output connector and the output shaft of the drive motor; and installed in the outer shell; and
an extension rod;
wherein:
the outer shell comprises a first shell, a second shell and a tail cover;
the first shell is provided with a first front end and a first tail end, and the second shell is provided with a second front end and a second tail end;
the first tail end is arranged away from the output connector relative to the first front end, and the second tail end is arranged away from the output connector relative to the second front end;
an outer periphery of the first tail end of the first shell and the second tail end of the second shell is surrounded by the tail cover;
a docking hole is defined by the first tail end of the first shell and the second tail end of the second shell cooperatively;
one end of the extension rod is threaded through the docking hole;
one of the first tail end of the first shell and the second tail end of the second shell is provided with a positioning protrusion, and the other one is provided with a second positioning groove;
the second positioning groove is configured to engage the positioning protrusion; and
an internal thread is formed on an inner wall surface of the docking hole, and one end of the extension rod is provided with an external thread matching the internal thread.

18. The cleaning brush main body of claim 16, wherein the at least one stage of planetary gear set comprises a first stage planetary gear set; and the first stage planetary gear set comprises:
a sun gear, anti-rotationally coupled to the output shaft of the drive motor;
an inner gear ring;
a rotating carrier; and
at least one planetary gear, rotatably supported on the rotating carrier, and wherein two sides of the at least one planetary gear are meshed with an outer periphery of the sun gear and an inner periphery of the inner gear ring respectively.

19. The cleaning brush main body of claim 16, further comprising a machine case and a case cover, and wherein:
the drive motor comprises a main body;
a space capable of accommodating the at least one stage of planetary gear set is defined by the case cover and the machine case cooperatively;
the output connector is rotatably inserted through the case cover; and
the machine case abuts between the main body of the drive motor and the case cover.

20. The cleaning brush main body of claim 19, further comprising a front cover, and wherein:
the outer shell comprises a front end and a tail end, and the front end of the outer shell abuts against the front cover;
the case cover comprises an inner cylindrical part and a ring body part connected to an outer periphery of the inner cylindrical part;
the inner cylindrical part is positioned and inserted into the front cover of the outer shell, and the output connector is rotatably inserted through the inner cylindrical part;
the ring body part is accommodated in the outer shell, and is disposed opposite to interior of the machine case; and
a fourth sealing element is abutted between an outer surface of the ring body part and the front cover, the fourth sealing element is in a thin ring shape, the fourth sealing element is disposed around the inner cylindrical part, and abuts between the ring body part and an inner surface of the front cover.

\* \* \* \* \*